Dec. 17, 1935.　　　　A. CALLSEN　　　　2,024,427
STARTING DEVICE FOR INTERNAL COMBUSTION ENGINES
Filed Oct. 3, 1933　　　2 Sheets-Sheet 1
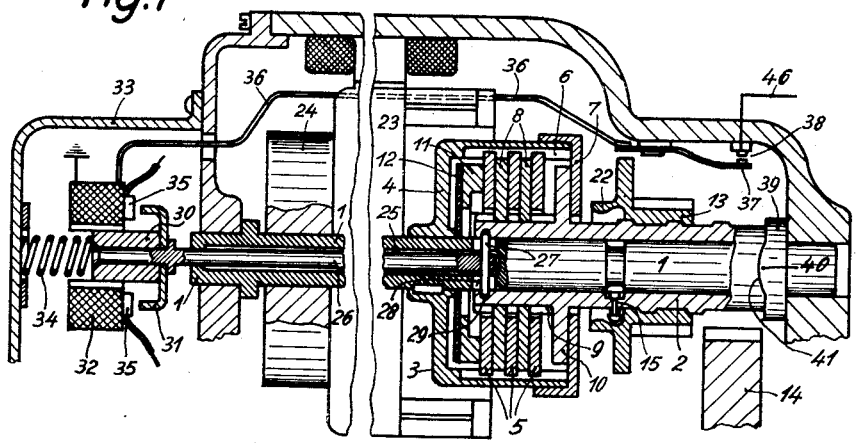
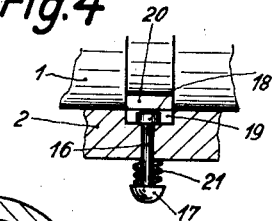
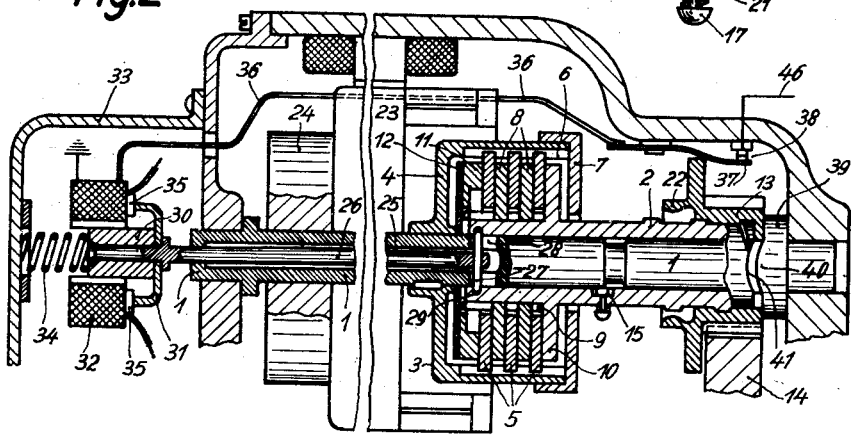
Inventor
Albert Callsen
by Steward & McKay
his attorneys Dec. 17, 1935. A. CALLSEN 2,024,427
STARTING DEVICE FOR INTERNAL COMBUSTION ENGINES
Filed Oct. 3, 1933 2 Sheets-Sheet 2
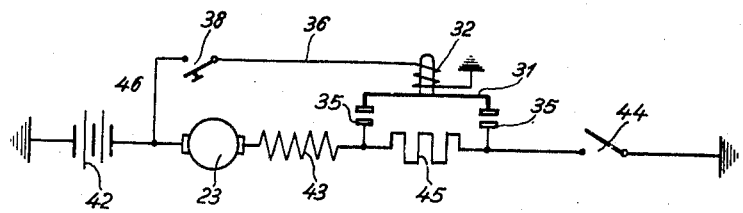
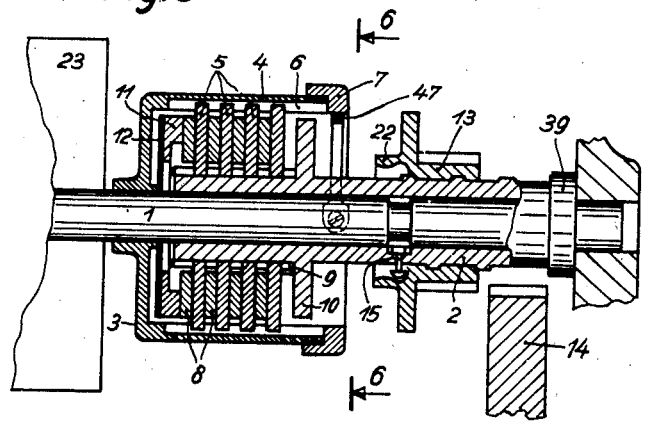
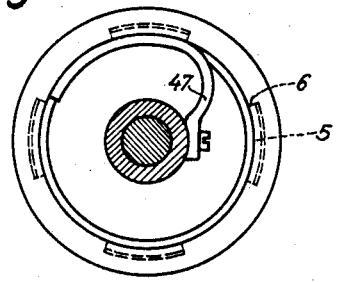

Patented Dec. 17, 1935

2,024,427

UNITED STATES PATENT OFFICE 2,024,427

STARTING DEVICE FOR INTERNAL COMBUSTION ENGINES

Albert Callsen, Stuttgart, Germany, assignor to Robert Bosch Aktiengesellschaft, Stuttgart, Germany Application October 3, 1933, Serial No. 692,018
In Germany October 8, 1932

22 Claims. (Cl. 290—38)

The present invention relates to a starting device for internal combustion engines having a pinion which works on a threaded shaft and having a friction clutch between the pinion and the driving shaft of the arrangement which is pressed by the pressure exerted by the quick pitch thread of the pinion. The known arrangements of this kind have the great drawback that the friction clutch is under full driving power when, on the engagement of the pinion, its teeth encounter the teeth of the toothed ring or crown on the flywheel of the engine, and therefore the teeth, which press on each other with great force, are moved forcibly past each other until the pinion teeth come into register with the tooth gaps of the flywheel ring. In these circumstances, the teeth of the pinion and the toothed ring of the flywheel are very rapidly worn out, or their faces so damaged that engagement is impossible when tooth meets tooth. These drawbacks are avoided according to the invention, by the friction clutch being so formed, that on the engagement on the pinion, it can transmit only a small torque, but on the starting of the engine a great torque.

Two examples of construction of the invention are shown in the accompanying drawings, in which:—

Figure 1 is a longitudinal sectional view of an electric starter in the position of repose.

Figure 2 is a similar view showing the starter in its working position.

Figure 3 is a diagram of the electrical connections of the starter.

Figure 4 is a fragmentary view.

Figure 5 is a sectional view of a second form of construction.

Figure 6 is a section on the line 6—6 of Figure 5.

On the starter shaft 1 of the electric starter illustrated is mounted a threaded sleeve 2, which is freely revoluble and axially displaceable relative to the shaft 1, but can be connected with it by means of a friction clutch 3. The part of the clutch connected with the shaft 1 consists of a bell 4 keyed on the shaft and a number of friction discs 5 engaging in grooves 6 in the wall of the bell, and of an annular disc 7 which is secured to the edge of the bell. The other part of the clutch is formed by friction discs 8 located in grooves 9 in the threaded sleeve 2 and by a flange 10 of the threaded sleeve which lies between the annular disc 7 and the friction discs 5, 8. The friction discs bear against a pressure plate 11, which in its turn bears on a springy disc 12.

On the threaded sleeve 2 is mounted a pinion 13, which in known manner can screw itself along for engaging in the toothed ring 14 of an engine fly-wheel. A locking device 15, the purpose of which will be hereinafter described, is arranged between the threaded sleeve 2 and the starter shaft 1 (Fig. 4). It consists of a pin 16, borne in the sleeve 2 and having two heads 17 and 18. The head 17 projects radially outwards from the threaded sleeve 2 whilst the head 18, on the other hand, lies in a recess 19 in the sleeve. The shaft 1 has a groove 20 into which the head 18 of the pin can engage when the pin is pressed inwards. The pin is pressed outwards by a spring 21 located between the sleeve and the head 17. The pin is forced inwards by the pinion 13, which for this purpose has an annular extension 22, the inner wall of which first contracts from the edge and then again enlarges into the form of a channel. The pin in the sleeve, the groove 20 in the shaft 1, and the contracted portion in the extension of the pinion are so arranged that they come to lie in one plane when the pinion is in contact with the crown or toothed ring 14 of the flywheel.

The shaft 1 has a flange or collar 39 between its bearing on the side where the pinion is situated and the threaded sleeve 2. This flange or collar has projections 40 on the side facing the sleeve 20, which engage in corresponding recesses 41 in the front end of the threaded sleeve.

That part of the shaft 1 on which the armature 23 and the commutator 24 of the starter are mounted has a bore 25, which extends from the end of the shaft up to about the middle of the clutch. In the bore is located a rod 26, which at its iner end carries a pin 27 which passes through slots 28 in the shaft 1 and engages in a groove 29 on the inner end of the threaded sleeve 2. On the end of the rod 26, projecting from the shaft 1 are secured an iron core 30 and a current bridge 31. The iron core lies within a magnet coil 32. A compression spring 34 is arranged between the end of the rod and the casing 33. Two contacts 35 are situated opposite the current bridge 31, and in the manner shown in the wiring diagram (Figure 3) lie in the circuit of the starter.

The magnet coil is connected by a cable 36 with the spring contact 37 of a switch 38, which is so arranged on the casing of the starter that the switch is closed by the pinion when this is in full engagement, but on the other hand is open when the pinion is out of engagement with the crown of the flywheel 14.

In the wiring diagram, 42 is a battery to which the armature 23 and the field-winding 43 are connected in series. 44 is the main switch of the starter circuit, and 45 a series resistance which is inserted in the circuit between the switch and the starter winding. At the ends of the series resistance, leads branch off to the contacts 35, which can be connected together by the current bridge 31. Further, a cable 46 is connected to the battery and leads to the switch 38, which is connected by the cable 36 with the magnet coil 32.

In Figure 1 the starter is shown in the position of repose. In order to put the starter into operation, the switch 44 is closed. A weak current due to the series resistance then flows at first from the battery through the starter, and causes the armature 23 and its shaft 1 to rotate at a relatively moderate speed. The threaded sleeve 2 is connected during this operation with the shaft 1 through the friction clutch consisting of the bell 4, disc 7, and flange 10 and compressed by the pressure of the spring 34, and therefore rotates with the shaft 1. At the same time the pinion 13 owing to its inertia screws itself along the sleeve 2 towards the flywheel crown 14. If now the teeth of the pinion encounter those of the crown of the flywheel, the pinion is thereby hindered both in its rotation with the sleeve 2 and also in further axial movement. The sleeve now tends to screw itself in the pinion, which tends to remain stationary away from the crown of the flywheel against pressure of the spring 34, and thereby reduces the coupling pressure of the discs 7 and 10. The clutch therefore begins to slip, and so long as the pinion is held fast, transmits only a quite small torque from the shaft 1 to the sleeve 2. Owing to the torque transmitted being small, the pressure with which the pinion is pressed against the crown of the flywheel, and the friction between the pinion and the crown of the flywheel, is also small, so that the pinion can be rotated by the continuous slight drive of the slipping clutch, until teeth of the pinion are in register with the tooth gaps of the flywheel. So long as the clutch is slipping the sleeve 2 rotates relative to the shaft 1 and is therefore pressed back by the projections 40 on the shaft 1 by a small amount. By this means the pinion is also momentarily lifted from the crown of the flywheel or at least its seat on the flywheel loosened and can rotate with the sleeve and correctly engage.

When tooth meets tooth, it may happen that the sleeve 2 owing to its inertia would tend to be screwed back in the pinion to such an extent that its flange 10 would come against the friction discs 5, 8 and drive them. The pin 16 in the sleeve 2 is provided in order to avoid this. It is forced by the extension 22 on the pinion into the groove 20 in the shaft precisely when the pinion comes in contact with the flywheel crown (Fig. 4). The sleeve 2 is so connected with the shaft 1 by the pin 16 that it can move axially only to such an extent as the head 18 has play in the groove. This amount is smaller than the distance of the flange 10 from the friction discs 5.

When the pinion is fully in mesh (Fig. 2), it closes the switch 38, which connects the magnet coil 32 with the battery. The magnet coil attracts the core 30 with the rod 26 and draws the sleeve 2, connected with the rod through the pin 27, towards the left (Fig. 2) away from the flywheel, the pin 16 having been previously released from the groove 20 by movement of the pinion fully into mesh with the flywheel crown. At the same time the flange 10 on the sleeve 2 comes to bear on the friction discs 5, 8 and actuates them. Further, the series resistance is short-circuited so that the starter is directly at the full voltage of the battery and works at full power. The clutching pressure of the friction discs 5, 8 that is exerted by the sleeve 2 increases according to the torque transmitted. As soon as the engine is started and running under its own power, the pinion screws itself out of the toothing on the flywheel crown and simultaneously the sleeve 2 is again pushed by the spring 34 towards the flywheel, so that the flange 10 again bears on the disc 7.

In Figures 5 and 6 a second form of construction is shown, in which the clutch for the starting of the engine is cut in by mechanical means instead of by a magnet coil. For this purpose a spring 47 is secured on the threaded sleeve 2 and bears on the inner wall or face of the bell 4. This arrangement works in the following way: When the starter is switched on by means of the switch 44, the armature shaft rotates and drives the sleeve 2 through the bell 4 and the spring, whereby the pinion travels towards the crown of the flywheel. When tooth meets tooth, the sleeve is secured against axial displacement for cutting in the clutch 5, 8 by the pin 16 depressed into the groove 20 of the shaft 1 by the extension 22 of the pinion, so that only a torque corresponding to the friction between the spring 47 and the bell 4 is transmitted to the sleeve 2 and the pinion 13 from the shaft 1. The axial pressure with which the pinion is pressed against the crown of the flywheel and the friction between the pinion and the crown of the flywheel is small, because the torque which is transmitted by the spring is slight. When the pinion is fully in mesh with the crown on the flywheel, the pin 16 is withdrawn from the groove 20 by the spring 21, and thus the sleeve 2 unlocked, so that it can screw itself towards the discs 5, 8 until the flange 10 bears on these discs, and thereby the clutch is cut in for the speeding up of the sleeve 2 and thus the engine.

The advantage of the invention lies in the fact that on the engagement of the pinion a clutch is effective which can transmit only a small torque. By this means the shock when tooth meets tooth and the friction on the teeth of the pinion and the flywheel is so weak that damage to the pinion or flywheel crown and a seizing of the pinion is avoided.

I declare that what I claim is:

1. A starting device for internal combustion engines, comprising a driving shaft, a pinion adapted for automatic axial displacement relatively to said shaft towards and away from a flywheel crown, a friction clutch between the driving shaft and the pinion and means movable in one direction for lightly engaging the said clutch during movement of the pinion into mesh with the flywheel crown and movable in the opposite direction for heavily engaging the clutch when the pinion is in mesh with the crown for starting up the engine.

2. A starting device for internal combustion engines, comprising a driving shaft, a pinion adapted for automatic axial displacement relatively to said shaft towards and away from a flywheel crown, resilient means for lightly clutching the pinion with the driving shaft during movement of the pinion into mesh with the flywheel crown and electromagnet means for heavily clutching the pinion with the shaft before the actual starting up of the engine.

3. A starting device for internal combustion engines, comprising a driving shaft, a pinion adapted for automatic axial displacement relatively to said shaft towards and away from a flywheel crown, resilient means for frictionally transmitting a relatively light torque from the driving shaft to the pinion during its movement into mesh with the flywheel crown and electromagnetic means for subsequently transmitting a heavier torque to the pinion when in mesh with the flywheel crown for starting up the engine.

4. A starting device for internal combustion engines, comprising a driving shaft, a pinion adapted for automatic axial displacement relatively to said shaft towards and away from a flywheel crown, a friction clutch between the driving shaft and the pinion, resilient means for lightly engaging the said clutch during movement of the pinion into engagement with the flywheel crown and electromagnetic means for heavily engaging the clutch when the pinion is in mesh with the crown for starting up the engine.

5. A starting device for internal combustion engines, comprising a driving shaft, a pinion adapted for automatic axial displacement relatively to said shaft towards and away from a flywheel crown, a friction clutch between the driving shaft and the pinion, means, governed by the axial position of the pinion, movable in one direction for lightly engaging the said clutch during movement of the pinion into engagement with the flywheel crown and movable in the opposite direction for heavily engaging the clutch when the pinion is in mesh with the crown for starting up the engine.

6. A starting device for internal combustion engines, comprising a driving shaft, a pinion adapted for automatic axial displacement relatively to said shaft towards and away from a flywheel crown, a friction clutch between the driving shaft and the pinion, and a screwable and axially displaceable pressure member adapted to govern the engagement of the clutch, said pressure member being adapted to exert pressure in one direction to cause a light engagement of the clutch during movement of the pinion into engagement with the flywheel crown and to exert pressure in the opposite direction for heavily engaging the clutch when the pinion is in mesh with the crown for starting up the engine.

7. A starting device for internal combustion engines, comprising a driving shaft, a pinion adapted for automatic axial displacement relatively to said shaft towards and away from a flywheel crown, a friction clutch between the driving shaft and the pinion, and a screwable and axially displaceable pressure member adapted to govern the engagement of the clutch, said pressure member being adapted to exert pressure in one direction to cause a light engagement of the clutch during movement of the pinion into engagement with the flywheel crown and to exert pressure in the opposite direction for heavily engaging the clutch when the pinion is in mesh with the crown for starting up the engine, and electromagnetic means for altering the direction of pressure of said pressure member for heavy engagement of the clutch.

8. A starting device for internal combustion engines comprising a driving shaft, a pinion adapted for automatic axial displacement relatively to said shaft towards and away from a flywheel crown, a friction clutch between the driving shaft and the pinion, and a screwable and axially displaceable pressure member adapted to govern the engagement of the clutch, said pressure member being adapted to exert pressure in one direction to cause a light engagement of the clutch during movement of the pinion into engagement with the fly wheel crown and to exert pressure in the opposite direction for heavily engaging the clutch when the pinion is in mesh with the crown for starting up the engine and electromagnetic means operable in dependence upon the position of the pinion for altering the direction of pressure of said pressure member for heavy engagement of the clutch.

9. A starting device for internal combustion engines comprising a shaft, a pinion adapted for automatic axial displacement relatively to said shaft towards and away from a fly wheel crown, a friction clutch between the driving shaft and the pinion, and a screwable and axially displaceable pressure member adapted to govern the engagement of the clutch, said pressure member being adapted to exert pressure in one direction to cause a light engagement of the clutch during movement of the pinion into engagement with the fly wheel crown and to exert pressure in the opposite direction for heavily engaging the clutch when the pinion is in mesh with the crown for starting up the engine, electromagnetic means for altering the direction of pressure of said pressure member for heavy engagement of the clutch and a switch in the circuit of said electromagnetic means adapted to be closed as the pinion moves into mesh with the fly wheel crown.

10. A starting device for internal combustion engines comprising a driving shaft, a sleeve rotatable and axially displaceable on said driving shaft and having at least one screw thread on its outer surface, a pinion on said driving shaft having at least one screw thread on its inner surface to cause axial displacement of the pinion relatively to the shaft towards and away from a fly wheel crown, a friction clutch between the driving shaft and the sleeve including at least one member connected to the driving shaft and at least one member connected to the sleeve, resilient means for lightly engaging the clutch during movement of the pinion into mesh with the fly wheel crown, the said sleeve being adapted for axial displacement in opposition to said resilient means to cause heavy engagement of the clutch when the pinion is in mesh with the fly wheel crown for starting up the engine.

11. A starting device for internal combustion engines comprising a driving shaft, a sleeve rotatable and axially displaceable on said driving shaft and having at least one screw thread on its outer surface, a pinion on said driving shaft having at least one screw thread on its inner surface to cause axial displacement of the pinion relatively to the shaft towards and away from a fly wheel crown, a friction clutch between the driving shaft and the sleeve including at least one member connected to the driving shaft and at least one member connected to the sleeve, resilient means for lightly engaging the clutch during movement of the pinion into mesh with the fly wheel crown, the said sleeve being adapted for axial displacement in opposition to said resilient means to cause heavy engagement of the clutch when the pinion is in mesh with the fly wheel crown for starting up the engine and locking means dependent upon the position of the pinion for limiting the axial displacement of the threaded sleeve between the times when the pinion first engages the crown and when it becomes fully in mesh with the crown.

12. A starting device for internal combustion engines comprising a driving shaft, a sleeve rotatable and axially displaceable on said driving shaft and having at least one screw thread on its outer surface, a pinion on said driving shaft having at least one screw thread on its inner surface to cause axial displacement of the pinion relatively to the shaft towards and away from a fly wheel crown, a friction clutch between the driving shaft and the sleeve including at least one member connected to the driving shaft and at least one member connected to the sleeve, resilient means for lightly engaging the clutch during movement of the pinion into mesh with the fly wheel crown, the said sleeve being adapted for axial displacement in opposition to said resilient means to cause heavy engagement of the clutch when the pinion is in mesh with the fly wheel crown for starting up the engine and a pin passing transversely through the threaded sleeve and through the driving shaft for interconnecting these two members.

13. A starting device for internal combustion engines comprising a driving shaft, a pinion adapted for automatic axial displacement relatively to said shaft towards and away from a fly wheel crown, means for transmitting a relatively small torque from the driving shaft to the pinion during movement of the pinion into mesh with the fly wheel crown, a friction clutch for transmitting a relatively heavy torque from the shaft to the pinion when this is in mesh with the fly wheel crown and mechanical means for engaging the friction clutch.

14. A starting device for internal combustion engines comprising a driving shaft, a pinion adapted for automatic axial displacement relatively to said shaft towards and away from a fly wheel crown, a continuously operating friction clutch for the transmission of a relatively small torque from the driving shaft to the pinion and a friction clutch adapted to come into operation and to transmit a relatively heavy torque from the driving shaft to the pinion when the pinion is in mesh with the fly wheel crown.

15. A starting device for internal combustion engines comprising a driving shaft, a pinion adapted for automatic axial displacement relatively to said shaft towards and away from a fly wheel crown, a continuously operating friction clutch for the transmission of a relatively small torque from the driving shaft to the pinion and a friction clutch adapted to come into operation and to transmit a relatively heavy torque from the driving shaft to the pinion when the pinion is in mesh with the fly wheel crown, the said continuously operating friction clutch being adapted to cause engagement of said clutch for transmitting the heavy torque when the pinion is in mesh with the fly wheel crown.

16. A starting device for internal combustion engines comprising a driving shaft, a rotatable and axially displaceable sleeve on said shaft having at least one screw thread on its outer surface, a pinion on said sleeve having at least one thread on its inner surface to cause axial displacement of the pinion relatively to the shaft towards and away from a fly wheel crown, a disengageable friction clutch between the driving shaft and the sleeve adapted to be engaged by the thrust of the sleeve when the pinion is in mesh with the fly wheel crown, and a continuously operating friction clutch adapted continuously to transmit a light torque from the driving shaft to the sleeve to cause a relatively gentle engagement of the pinion into mesh with the fly wheel crown and also to set up an initial thrust between the sleeve and the clutch after the pinion has meshed with the fly wheel crown.

17. A starting device for internal combustion engines comprising a driving shaft, a pinion adapted for automatic axial displacement relatively to said shaft towards and away from a fly wheel crown, an electric motor mounted on said shaft, resilient means for lightly clutching the pinion with the driving shaft during movement of the pinion into mesh with the fly wheel crown, electromagnetic means for heavily clutching the pinion with the driving shaft when the pinion is in mesh with the fly wheel crown, and means for increasing the power output of said motor when the pinion is in mesh with the fly wheel crown.

18. A starting device for internal combustion engines comprising a driving shaft, means mounted on said shaft for rotary and axial movement relative thereto, means for clutching said means to said shaft, a pinion driven by and mounted on said first-mentioned means for automatic displacement relative thereto towards and away from a flywheel crown, said first-mentioned means causing a light engagement of said clutching means during movement of the pinion into mesh with the flywheel crown and being axially movable to cause a heavy engagement of said clutching means when the pinion is in mesh with the crown for starting up the engine.

19. A starting device as in claim 18 including resilient means for urging said first-mentioned means in one direction axially of said shaft, and electromagnetic means for initiating movement in the opposite direction.

20. A starting device for internal combustion engines comprising a driving shaft, a sleeve mounted on said shaft for rotary and axial movement relative thereto, means including two sets of clutch surfaces for clutching said sleeve to said shaft, a pinion driven by and mounted on said sleeve for automatic displacement relative thereto toward and away from a flywheel crown, one set of said clutch surfaces being in engagement during movement of said pinion into mesh with the flywheel crown to transmit a relatively light torque from the driving shaft to said pinion during said movement, said sleeve being axially movable to cause engagement of the other clutch surfaces to transmit a heavier torque from the driving shaft to the pinion when said pinion is in mesh with the flywheel crown.

21. A starting device as in claim 20 including resilient means urging said sleeve to cause light engagement of one set of clutch surfaces and means controlled by said pinion for operating said sleeve to cause engagement of said other clutch surfaces.

22. A starting device as in claim 20 including resilient means urging said sleeve to cause light engagement of one set of clutch surfaces, and electromagnetic means to initiate engagement of the other clutch surfaces, the reaction of the pinion when in mesh with the flywheel crown operating said sleeve to cause a heavy engagement of said other clutch surfaces.

ALBERT CALLSEN.